(12) United States Patent
Marsh

(10) Patent No.: US 10,965,782 B2
(45) Date of Patent: Mar. 30, 2021

(54) COORDINATING SERVICES ACROSS MULTIPLE PROVIDERS

(71) Applicant: TreSensa Inc., New York, NY (US)

(72) Inventor: Oliver Marsh, San Francisco, CA (US)

(73) Assignee: TreSensa Technologies, Inc., New York, NY (US)

( * ) Notice: Subject to any disclaimer, the term of this patent is extended or adjusted under 35 U.S.C. 154(b) by 0 days.

(21) Appl. No.: 16/451,820

(22) Filed: Jun. 25, 2019

(65) Prior Publication Data
US 2019/0320044 A1 Oct. 17, 2019

Related U.S. Application Data

(63) Continuation of application No. 14/706,646, filed on May 7, 2015, now Pat. No. 10,382,586.
(Continued)

(51) Int. Cl.
*H04L 29/06* (2006.01)
*H04L 29/08* (2006.01)
(Continued)

(52) U.S. Cl.
CPC ............. *H04L 67/38* (2013.01); *G06Q 20/10* (2013.01); *G06Q 20/102* (2013.01); *G06Q 20/14* (2013.01);
(Continued)

(58) Field of Classification Search
CPC ......... H04L 67/38; H04L 67/04; H04L 67/10; H04L 67/42; G06Q 30/06; G06Q 20/405; G06Q 30/0635; G06Q 20/4014; G06Q 20/10; G06Q 20/102; G06Q 40/04; G06Q 30/0601; G06Q 50/10; G06Q 20/401;
(Continued)

(56) References Cited

U.S. PATENT DOCUMENTS

2002/0062270 A1 5/2002 Star
2004/0139032 A1 7/2004 Rowan
(Continued)

FOREIGN PATENT DOCUMENTS

CN 101110756 A * 1/2008

*Primary Examiner* — Glenford J Madamba
*Assistant Examiner* — Weiwei Y Stiltner
(74) *Attorney, Agent, or Firm* — Lowenstein Sandler LLP

(57) ABSTRACT

A method includes: processing, by a processing device of a services coordination platform, a request from an application in relation to one or more of a plurality of leaderboard platforms to identify a leaderboard platform capable of executing a leaderboard service associated with the request, wherein the request comprises transaction parameters in a first format; formatting, by the services coordination platform, the transaction parameters into a second format, wherein the transaction parameters in the first format are incompatible with the leaderboard platform, and the transaction parameters in the second format are compatible with the leaderboard platform; providing, by the services coordination platform, the transaction parameters in the second format to the leaderboard platform; receiving, by the services coordination platform, a transaction outcome from the leaderboard platform with respect to the leaderboard service; and providing, by the services coordination platform, the transaction outcome to the application.

17 Claims, 3 Drawing Sheets

Related U.S. Application Data

(60) Provisional application No. 61/989,753, filed on May 7, 2014.

(51) Int. Cl.
| | |
|---|---|
| *H04W 4/50* | (2018.01) |
| *G06Q 30/06* | (2012.01) |
| *G06Q 20/40* | (2012.01) |
| *G06Q 20/10* | (2012.01) |
| *G06Q 40/04* | (2012.01) |
| *G06Q 50/10* | (2012.01) |
| *G06Q 40/06* | (2012.01) |
| *G06Q 20/14* | (2012.01) |
| *G06Q 20/32* | (2012.01) |
| *G06Q 20/36* | (2012.01) |

(52) U.S. Cl.
CPC ......... *G06Q 20/3224* (2013.01); *G06Q 20/36* (2013.01); *G06Q 20/401* (2013.01); *G06Q 20/405* (2013.01); *G06Q 20/4014* (2013.01); *G06Q 30/06* (2013.01); *G06Q 30/0601* (2013.01); *G06Q 30/0635* (2013.01); *G06Q 40/04* (2013.01); *G06Q 40/06* (2013.01); *G06Q 50/10* (2013.01); *H04L 67/04* (2013.01); *H04L 67/10* (2013.01); *H04L 67/42* (2013.01); *H04W 4/50* (2018.02)

(58) Field of Classification Search
CPC .... G06Q 40/06; G06Q 20/14; G06Q 20/3224; G06Q 20/36; H04W 4/50
USPC ........................................................ 709/203
See application file for complete search history.

(56) References Cited

U.S. PATENT DOCUMENTS

| | | | |
|---|---|---|---|
| 2008/0113805 A1* | 5/2008 | David | A63F 13/12 463/42 |
| 2009/0089838 A1* | 4/2009 | Pino, Jr. | H04N 21/4788 725/40 |
| 2009/0112661 A1 | 4/2009 | Mullen et al. | |
| 2011/0088099 A1 | 4/2011 | Villani et al. | |
| 2012/0143949 A1* | 6/2012 | Kumar | H04L 67/2823 709/204 |
| 2014/0214651 A1 | 7/2014 | Prasadh | |
| 2014/0341085 A1* | 11/2014 | Suryavanshi | H04L 65/1016 370/260 |
| 2014/0343950 A1 | 11/2014 | Simpson et al. | |
| 2015/0141149 A1* | 5/2015 | Thomas | A63F 13/30 463/42 |
| 2015/0169705 A1 | 6/2015 | Korbecki et al. | |
| 2015/0262085 A1 | 9/2015 | Mader et al. | |
| 2015/0294315 A1 | 10/2015 | Agrawal | |
| 2016/0210617 A1 | 7/2016 | Leger | |
| 2017/0134424 A1* | 5/2017 | Egorov | H04L 67/1002 |

\* cited by examiner

COORDINATING SERVICES ACROSS MULTIPLE PROVIDERS

CROSS-REFERENCE TO RELATED APPLICATION

This application is a continuation of U.S. patent application Ser. No. 14/706,646, filed May 7, 2015, which claims the benefit of U.S. Provisional Patent Application No. 61/989,753, filed May 7, 2014, the entirety of which is incorporated herein by reference.

TECHNICAL FIELD

Aspects and implementations of the present disclosure relate to data processing, and more specifically, to coordinating services across multiple providers.

BACKGROUND

Mobile applications or 'apps' may utilize/interface with various third-party services (e.g., payment platforms, leaderboards, etc.). Multiple versions of the application (each of which is configured for certain services/platforms) may need to be developed and maintained in order to enable the application to be broadly/universally accessible.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device receives, from an application, a request to initiate a transaction. The processing device processes the request in relation to one or more service providers to identify a service provider with respect to which the transaction is to be executed. The processing device provides the request to the service provider. The processing device receives transaction outcome from the service provider with respect to the transaction. The processing device provides the transaction outcome to the application.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
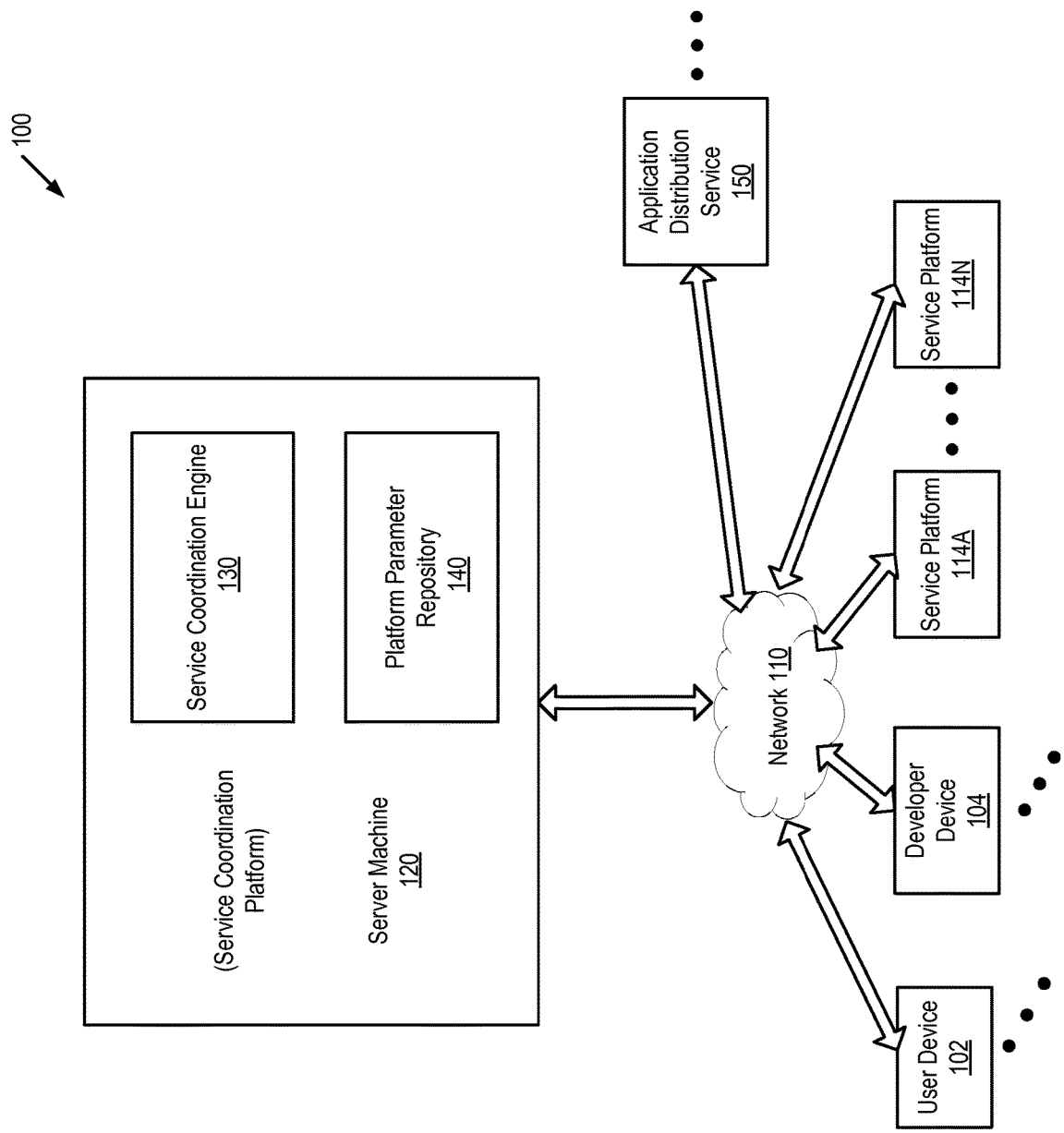
FIG. 1 depicts an illustrative system architecture, in accordance with one implementation of the present disclosure.

Aspects and implementations of the present disclosure are directed to coordinating services across multiple providers. The systems and methods disclosed can be applied to digital media content such as applications, games, etc., such as those that can be provided/deployed within various contexts such as on mobile computing devices, laptop/desktop computers, incorporated/embedded within websites, etc. More particularly, it can be appreciated that it may be advantageous for application developers (such as game developers) to interface with/incorporate services such as third-party services within applications that they develop. Examples of such services include but are not limited to billing platforms (e.g., platforms through which users can provide and developers can receive payment for additional features, characters, options, etc., within an application/game), leaderboards (e.g., lists of users and their respective scores for a particular game), advertising services (e.g., exchanges through which sponsored content can be directed to individual users), analytics services (e.g., tools and applications configured to track/analyze various aspects of the performance/usage of an application), etc.

It can be further appreciated that while a developer may develop a single application/game (e.g., a game which can be played in multiple contexts/settings, such as on a mobile device, in a web browser, embedded within a social networking service, etc.), in order to utilize the features provided by different service providers/partners (e.g., billing services, leaderboard/achievement services, virtual/digital currency, advertising services, analytics services, etc.), the developer may need to modify/adapt various aspect of such an application/game in order to conform with the parameters, settings, requirements, etc., of each provider. Such an arrangement is neither advantageous to the developer (who may be required to configure a single application/game multiple times in order to enable it to be properly used across multiple platforms), nor to the service providers (who may miss out on processing transactions for applications/games which are not properly configured), nor for application/game users/players (who may be unable to utilize certain applications/games and/or certain features of such applications/games in scenarios in which the application/game is not properly configured with a particular service provider).

Accordingly, described herein are technologies that enable the centralized coordination of services across multiple providers. That is, by incorporating one or more application elements/components (e.g., an SDK) within an application, the configuration/coordination of various aspects/functions of the application/game can be forwarded or handed-off to another application/service. For example, with respect to in-app purchases or payments that are to be collected with respect to a particular application/game, the game/application can be configured with a payment function/module through which one or more payment parameters can be collected and provided to another application/service such as a centralized application/game services coordination platform. Such a centralized platform can then determine the appropriate third party service/provider with respect to which the transaction should be executed (e.g., based on the context within which the application/game is being used, such as whether the game is embedded within a social networking service, being played on a particular mobile platform/operating system, etc.), and can pass on the payment parameters provided by the application/game itself to the appropriate third party platform for execution. In doing so, by receiving transaction requests from an application and utilizing a centralized system to determine the appropriate payment processing platform for such requests (as well as coordinating the processing of the transaction with the third party platform), an application/game developer can utilize essentially any third party platform (e.g., payment processing platform, etc.) without modifying or customizing any aspects of the application/game itself.

FIG. 1 depicts an illustrative system architecture 100, in accordance with one implementation of the present disclosure. The system architecture 100 includes one or more user devices 102, developer devices 104, service platforms 114A-N, server machine 120, and application distribution service 150. These various elements or components can be connected to one another via network 110, which can be a public network (e.g., the Internet), a private network (e.g., a local area network (LAN) or wide area network (WAN)), or a combination thereof. Additionally, in certain implementations various elements may communicate and/or otherwise interface directly with one another.

User device 102 can be a rackmount server, a router computer, a personal computer, a portable digital assistant, a mobile phone, a laptop computer, a tablet computer, a camera, a video camera, a netbook, a desktop computer, a media center, a smartphone, a watch, a smartwatch, an in-vehicle computer/system, any combination of the above, or any other such computing device capable of implementing the various features described herein. Various applications, such as mobile applications ('apps') (e.g., those received from application distribution service 150), web browsers, etc. (not shown) may run on the user device (e.g., on the operating system of the user device). It should be understood that, in certain implementations, user device 102 can also include and/or incorporate various sensors and/or communications interfaces (not shown). Examples of such sensors include but are not limited to: accelerometer, gyroscope, compass, GPS, haptic sensors (e.g., touchscreen, buttons, etc.), microphone, camera, etc. Examples of such communication interfaces include but are not limited to cellular (e.g., 3G, 4G, etc.) interface(s), Bluetooth interface, WiFi interface, USB interface, NFC interface, etc.

Developer device 104 can be a rackmount server, a router computer, a personal computer, a portable digital assistant, a mobile phone, a laptop computer, a tablet computer, a camera, a video camera, a netbook, a desktop computer, a media center, a smartphone, a watch, a smartwatch, an in-vehicle computer/system, any combination of the above, or any other such computing device capable of implementing the various features described herein. Various applications, such as mobile applications ('apps'), web browsers, etc. (not shown) may run on the developer device (e.g., on the operating system of the developer device). Moreover, in certain implementations such applications can be developed, modified, etc., at developer device 104 and provided to application distribution service 150 (such that they can be distributed to other devices such as user devices 102). It should be understood that, in certain implementations, developer device 104 can also include and/or incorporate various sensors and/or communications interfaces (not shown). Examples of such sensors include but are not limited to: accelerometer, gyroscope, compass, GPS, haptic sensors (e.g., touchscreen, buttons, etc.), microphone, camera, barcode scanner, etc. Examples of such communication interfaces include but are not limited to cellular (e.g., 3G, 4G, etc.) interface(s), Bluetooth interface, WiFi interface, USB interface, NFC interface, etc.

Server machine 120 can be a rackmount server, a router computer, a personal computer, a portable digital assistant, a mobile phone, a laptop computer, a tablet computer, a camera, a video camera, a netbook, a desktop computer, a smartphone, any combination of the above, or any other such computing device capable of implementing the various features described herein. Server machine 120 can include components such as service coordination engine 130, and platform parameter repository 140. The components can be combined together or separated in further components, according to a particular implementation. It should be noted that in some implementations, various components of server machine 120 may run on separate machines (for example, platform parameter repository 140 can be a separate device). Moreover, some operations of certain of the components are described in more detail below.

Platform parameter repository 140 can be hosted by one or more storage devices, such as main memory, magnetic or optical storage based disks, tapes or hard drives, NAS, SAN, and so forth. In some implementations, platform parameter repository 140 can be a network-attached file server, while in other implementations platform parameter repository 140 can be some other type of persistent storage such as an object-oriented database, a relational database, and so forth, that may be hosted by the server machine 120 or one or more different machines coupled to the server machine 120 via the network 110, while in yet other implementations platform parameter repository 140 may be a database that is hosted by another entity and made accessible to server machine 120. Platform parameter repository 140 can store information relating to various platforms (e.g., service platforms 114A-N, e.g., payment platforms, etc.), such as parameters and/or configuration information that dictate/define how information is to be provided to/received from such platforms.

Application distribution service(s) 150 can be a rackmount server, a router computer, a personal computer, a portable digital assistant, a mobile phone, a laptop computer, a tablet computer, a camera, a video camera, a netbook, a desktop computer, a smartphone, any combination of the above, or any other such computing device capable of implementing the various features described herein. In certain implementations, application distribution service 150 can maintain a repository of applications ('apps'), such as those that may be provided by developer device(s) 104, and can provide such applications to user device (s) 102 in response to requests from such device(s). Application distribution service 150 may also coordinate the providing of updates to such applications to users that have previously installed a particular application. It should be understood that various application distribution services may provide applications to different devices (e.g., those utilizing different operation systems, those in different locations, those operating on different networks, etc.).

It should be understood that though FIG. 1 depicts server machine 120, devices 102 and 104, platforms 114, and service 150 as being discrete components, in various implementations any number of such components (and/or elements/functions thereof) can be combined, such as within a single component/system. For example, in certain implementations devices 102 and/or 104 can incorporate features of server machine 120.

As described in detail herein, various technologies are disclosed that enable coordinating services across multiple providers. In certain implementations, such technologies can encompass operations performed by and/or in conjunction with service coordination engine 130.

Upon receiving a transaction request from an application/game (e.g., an in-app purchase) (e.g., an application executing on user device 102), such a request can be processed (e.g., by service coordination engine 130) to determine the appropriate third party provider (e.g., platforms 114A-N) with respect to which the transaction should be executed. For example, various aspects of the transaction (e.g., the context/platform on which a game is being played, the mobile carrier to which the device on which the game being played is connected, etc.) can be processed against a database of multiple service providers (e.g., payment processing services) (such as may be stored in platform parameter repository 140) in order to identify the appropriate provider/platform 114 that can best process the transaction. Upon identifying such a provider, the transaction request (e.g., various transaction parameters provided by the application/game, such as user information, payment information, etc.) can be routed/mapped to the service provider (e.g., by configuring/packaging the received transaction parameters in a format required by the particular service provider), based upon which the service provider can process the transaction.

Upon processing the transaction (e.g., approving or denying the transaction), the service provider/platform 114 can provide transaction outcome information back to the centralized processing system which can, in turn, provide such information back to the application/game itself (and can be presented to the user device 102 e.g., as a transaction success/failure message). It should be noted that, in certain implementations, various aspects of such transaction outcome information can be customized or adjusted by the centralized system, such as by customizing the transaction success message to be directed personally to the user him/herself, etc.

Additionally, in certain implementations the centralized processing system (e.g., server 120) can utilize various information pertaining to the requesting user/user device 102 in order to better determine the appropriate service provider/platform 114 with respect to which a particular transaction request should be routed. For example, based on a determination that users from a particular demographic (e.g., those living in a particular country) are relatively unlikely to utilize in app purchases (e.g., paying actual money for such purchases), one or more alternatives can be utilized in lieu of such options (e.g., by enabling such users to take a survey, watch advertisements, etc.) in order to complete the transaction in lieu of actual payment options).

Moreover, in certain implementations various determinations can be made with respect to selecting from among several service providers/platforms that may be eligible to process a particular transaction. It can be appreciated that while multiple providers/platforms may be so eligible, each provider may charge a different rate, resulting in differing amounts that will ultimate be passed on to the developer. Accordingly, in determining which payment processing service to utilize, the amount/percentage of the payment that will ultimately be paid back to the developer can be accounted for in determining which service to utilize (and/or whether to utilize an alternative payment method, such as having the user take a survey in lieu of payment, etc.).

Additionally, in certain implementations the centralized transaction routing techniques described herein can enable a developer (e.g., developer device 104) to implement various promotions with respect to an application/game across multiple service providers/platforms 114. For example, in a scenario in which a developer wishes to provide a particular item/feature (e.g., an in-app purchase) for free (e.g., for a limited time, such as during a promotion), this option can be configured via the centralized processing system (e.g., server 102) (e.g., by bypassing the request to a service provider and returning a successful transaction response to the application). This can be particularly advantageous as compared to an alternative scenario in which each of multiple versions of an application/game may need to be reconfigured in order to enable such a promotion across all versions of the application/game. It should be understood that various aspects of such in-app purchases can also be configured/adjusted in a similarly centralized manner. For example, a developer 104 may enable users 102 to receive paid items/features in an application/game in exchange for downloading/using another application provided by the developer. Again, an adjustment such as this can be coordinated by the central processing system (e.g., server 102) (e.g., in conjunction with application distribution service 150) in lieu of having to configure multiple versions of the same application/game in order to effect such a change across all versions.

Various aspects of the technologies described herein include one or more methods, such as those described herein. The method is performed by processing logic that may comprise hardware (circuitry, dedicated logic, etc.), software (such as is run on a general purpose computer system or a dedicated machine), or a combination of both. For simplicity of explanation, methods are described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 2:
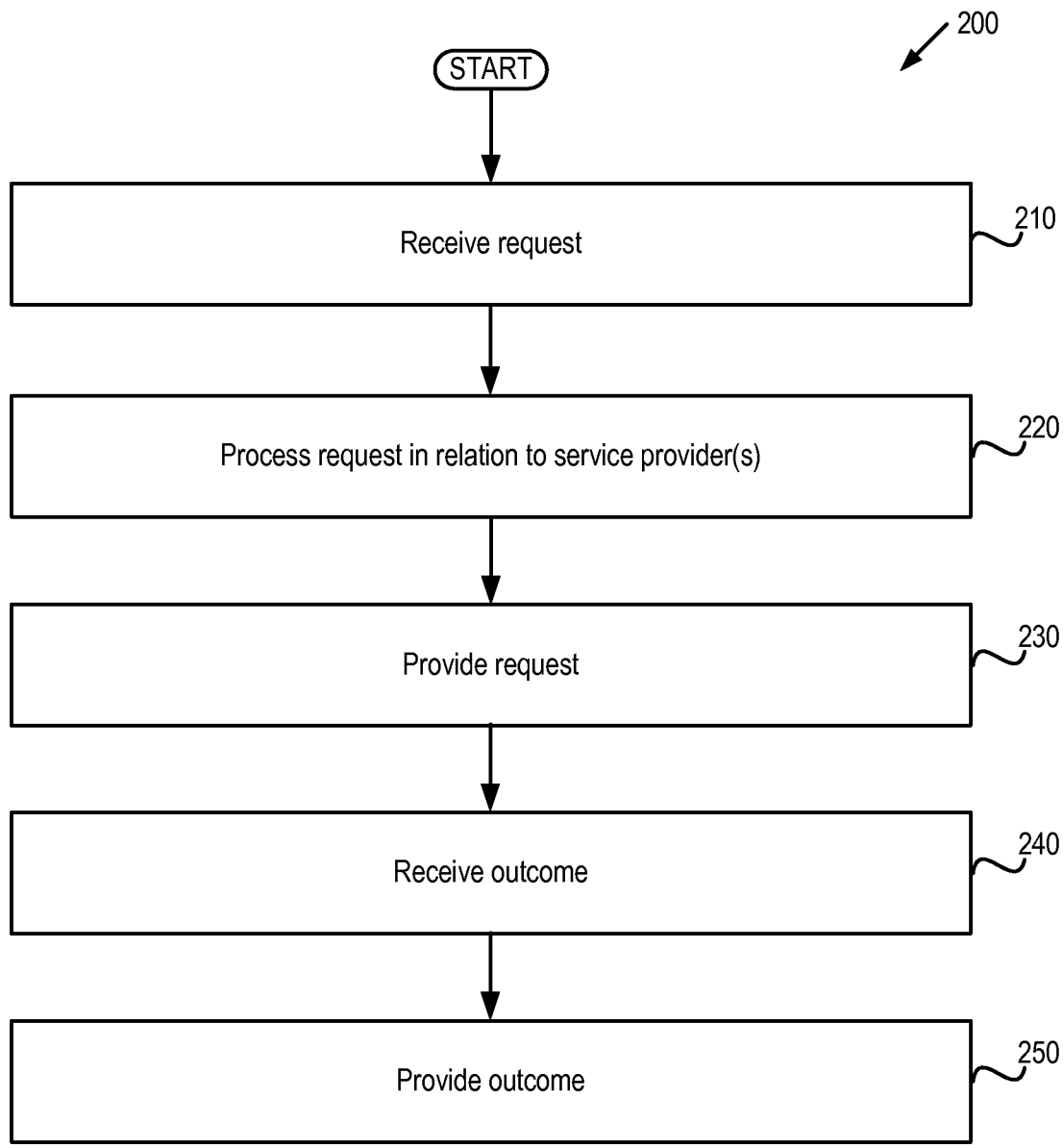
FIG. 2 depicts a flow diagram of aspects of a method for coordinating services across multiple providers.

For example, FIG. 2 depicts an exemplary flow diagram showing a method of coordinating services across multiple providers, such as is described herein.

At block 210, a request to initiate a transaction can be received, such as from an application (e.g., an application incorporating an SDK such as the one described herein). In certain implementations, such a request (e.g., a request for an in-app purchase) can originate from an application executing on user device 102. Moreover, in certain implementations, such a request can be a service request (e.g., a request that may pertain to a particular service, e.g., a leaderboard service, advertising service, etc.). It should be understood that, in certain implementations, various aspects of block 210 can be performed by service coordination engine 130 and/or server machine 120, while in other implementations such aspects may be performed by one or more other elements/components, such as those described herein.

At block 220, the request (e.g., the request received at 210) can be processed. In certain implementations, the request can be processed in relation to one or more service providers/platforms (e.g., platforms 114) (e.g., payment processors/platforms, advertising platforms, leaderboard platforms, etc.). In doing so, one (or more) service provider(s) can be identified, such as those with respect to which the service request/transaction can be executed. In certain implementations, one or more aspects of the request (e.g., various parameters, etc., associated with the request itself, the user associated with the user device 102 from which the request originated, the device itself, etc.) can be processed in order to identify a service provider/platform with respect to which the transaction is to be executed (e.g., a service provider/platform capable of executing the transaction in a manner that is compatible with the request and the user/device from which it originated). Additionally, in certain implementations the request can be processed in relation to various parameters associated with the various platforms/service providers 114 (as may be stored in platform parameter repository 140). Examples of such parameters include but are not limited to: the types of services/transactions processed by the platform, the terms with respect to which such services/transactions are processed by the platform, etc. In doing so, a service provider with respect to which the transaction is to be executed can be identified, based on, for example the request (as received at 210) and at the referenced platform parameters. Moreover, in certain implementations one or more aspects of the received request can be processed in relation to various parameters associated with the various service providers 114. In doing so, a service provider with respect to which the transaction is to be executed can be identified, based on, for example, one or more aspects of the request (e.g., various parameters, etc., associated with the request itself, the user associated with the user device 102 from which the request originated, the device itself, etc.) and/or one or more of the referenced service/platform parameters (e.g., the types of services/transactions processed by the platform, the terms with respect to which such services/transactions are processed by the platform). Additionally, in certain implementations various aspects of the received request (e.g., as received at 210) can be processed in relation to various parameters associated with a provider of the application (e.g., developer 104) to identify, based on the various aspects of the request and the referenced parameters, a service provider/platform with respect to which the transaction is to be executed (for example, a platform that provides the most advantageous return/payment terms to the developer). Moreover, in certain implementations various previously executed transactions (e.g., transactions similar to the received request) can be processed in order to identify the service provider/platform with respect to which the transaction is to be executed. In certain implementations, the referenced service provider/platform can be identified based an identification of the service provider with respect to various previously executed transactions (e.g., a determination that previous transactions—e.g., in-app purchases—that are comparable in one or more ways to the received request, were successfully/satisfactorily completed). In certain implementations, various aspects of block 220 can be performed by service coordination engine 130 and/or server machine 120, while in other implementations such aspects may be performed by one or more other elements/components, such as those described herein.

At block 230, the request (such as that received at 210 and processed at 220) can be provided, such as to one or more of the identified service providers/platforms 114 (such as those identified at 220. As noted, in certain implementations such a provider/platform can be selected, for example, based on an amount/percentage that the service provider agrees to pay out to the developer in return for processing the transaction. Moreover, in certain implementations the request can be configured in relation to various parameters associated with the service provider/platform. For example, the request (as received from the user device) can be modified, formatted, etc., such that it conforms to the requirements of the provider/platform identified at 220. In certain implementations, various aspects of block 230 can be performed by service coordination engine 130 and/or server machine 120, while in other implementations such aspects may be performed by one or more other elements/components, such as those described herein.

At block 240, a transaction outcome/service response can be received. In certain implementations, such an outcome/response (e.g., approval, denial, etc.) can be received from the service provider/platform 114 with respect to the transaction. Moreover, in certain implementations, various aspects of block 240 can be performed by service coordination engine 130 and/or server machine 120, while in other implementations such aspects may be performed by one or more other elements/components, such as those described herein.

At block 250, the transaction outcome/service response (such as that received at 240) can be provided. In certain implementations, such an outcome/response can be provided to the application/device from which the request originated. Moreover, in certain implementations such a transaction outcome/response can be configured in relation to various aspects of the application, such as in a manner described herein (e.g., by customizing/personalizing the response based on information associated with the user). In certain implementations, various aspects of block 250 can be performed by service coordination engine 130 and/or server machine 120, while in other implementations such aspects may be performed by one or more other elements/components, such as those described herein.

It should be noted that though much of the forgoing description is directed to implementations pertaining to transactions such as in-app purchases, the scope of the present disclosure is not so limited. Accordingly, it should be understood that the technologies described herein can be similarly implemented in any number of other settings and/or contexts. For example, the technologies described herein can be configured with respect to one or more billing platforms (e.g., various platforms through which users can provide and developers can receive payment for additional features, virtual/digital currency, characters, options, etc., within an application/game), leaderboards (e.g., various lists of users and their respective scores for a particular game), advertising services (e.g., various exchanges through which sponsored content can be directed to individual users), analytics services (e.g., various tools and applications configured to track/analyze various aspects of the performance/usage of an application), and many others. In doing so, a developer can create a single application/game which can, in turn, interface with any number of services without necessitating modification to the application/game itself.

Figure 3:
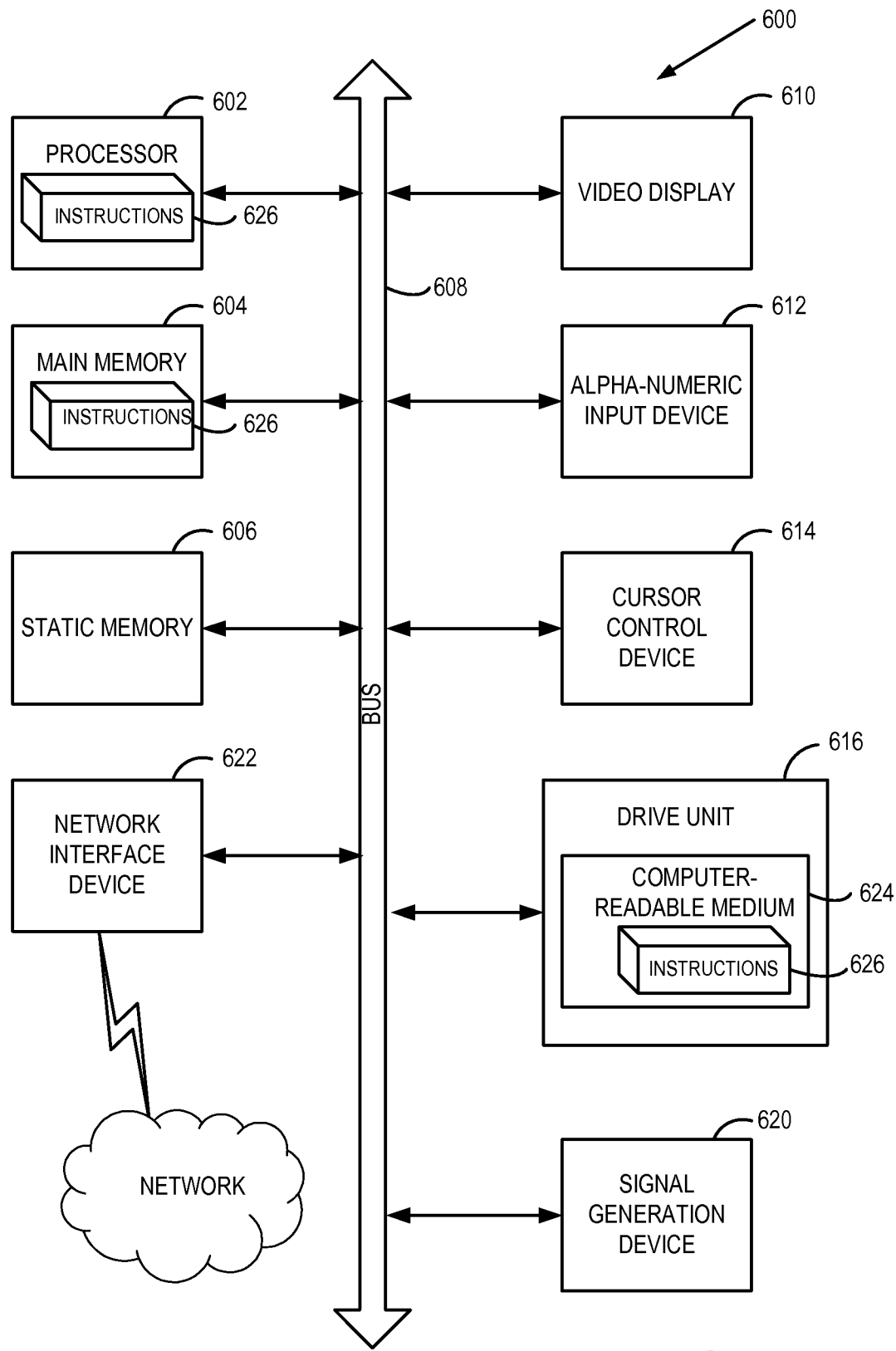
FIG. 3 depicts a block diagram of an illustrative computer system operating in accordance with aspects and implementations of the present disclosure.

FIG. 3 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a mobile or tablet computer, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions executed by collaboration manager 225, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "receiving," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    identifying, by a processing device of a services coordination platform, a first leaderboard request from a first application, wherein the first leaderboard request comprises first transaction parameters in a first format;
    identifying previously executed leaderboard requests similar to the first leaderboard request;
    determining that one or more of the previously executed leaderboard requests were completed via a leaderboard platform;
    formatting, by the processing device, the first transaction parameters of the first leaderboard request into a second format, wherein the first transaction parameters in the first format are incompatible with the leaderboard platform and the first transaction parameters in the second format are compatible with the leaderboard platform; and responsive to providing the first transaction parameters in the second format to the leaderboard platform, receiving, by the processing device, a first transaction outcome from the leaderboard platform with respect to the first leaderboard request service, wherein the first transaction outcome for the first leaderboard request is to be provided to the first application.

2. The method of claim 1 further comprising:

receiving, by the processing device, a second request from a second application, wherein the second request comprises second transaction parameters in a third format that are incompatible with the leaderboard platform;

formatting, by the processing device, the second transaction parameters into the second format that are compatible with the leaderboard platform; and responsive to providing the second transaction parameters in the second format to the leaderboard platform, receiving, by the processing device, a second transaction outcome from the leaderboard platform with respect to the second request.

3. The method of claim 1, wherein of the first leaderboard request is to be executed by the leaderboard platform to provide a list of users and respective scores to the first application.

4. The method of claim 1, wherein the first transaction outcome comprises approval or denial of the first leaderboard request, wherein the method further comprises configuring the first transaction outcome based on the first application.

5. The method of claim 1, wherein the leaderboard platform is identified based on one or more of:

user information of a user that transmitted the first leaderboard request via a first user device; or device information of the first user device.

6. The method of claim 1, wherein the leaderboard platform is identified based on one or more of:

the first transaction parameters of the first leaderboard request; or location from which the first leaderboard request was transmitted.

7. A system comprising:

a memory; and a processing device, operatively coupled to the memory, to:

identify a first leaderboard request from a first application, wherein the first leaderboard request comprises first transaction parameters in a first format;

identify previously executed leaderboard requests similar to the first leaderboard request;

determine that one or more of the previously executed leaderboard requests were completed via a leaderboard platform;

format the first transaction parameters of the first leaderboard request into a second format, wherein the first transaction parameters in the first format are incompatible with the leaderboard platform and the first transaction parameters in the second format are compatible with the leaderboard platform; and responsive to providing the first transaction parameters in the second format to the leaderboard platform, receive a first transaction outcome from the leaderboard platform with respect to the first leaderboard request, wherein the first transaction outcome for the first leaderboard request is to be provided to the first application.

8. The system of claim 7, wherein the processing device is further to:

receive a second request from a second application, wherein the second request comprises second transaction parameters in a third format that are incompatible with the leaderboard platform;

format the second transaction parameters into the second format that are compatible with the leaderboard platform; and responsive to providing the second transaction parameters in the second format to the leaderboard platform, receive a second transaction outcome from the leaderboard platform with respect to the second request.

9. The system of claim 7, wherein the first leaderboard request is to be executed by the leaderboard platform to provide a list of users and respective scores to the first application.

10. The system of claim 7, wherein the first transaction outcome comprises approval or denial of the first leaderboard request, wherein the processing device is further to configure the first transaction outcome based on the first application.

11. The system of claim 7, wherein the leaderboard platform is identified based on one or more of:

user information of a user that transmitted the first leaderboard request via a first user device; or device information of the first user device.

12. The system of claim 7, wherein the leaderboard platform is identified based on one or more of:

the first transaction parameters of the first leaderboard request; or location from which the first leaderboard request was transmitted.

13. A non-transitory computer readable medium having instructions stored thereon that, when executed by a processing device, cause the processing device to:

identify a first leaderboard request from a first application, wherein the first leaderboard request comprises first transaction parameters in a first format;

identify previously executed leaderboard requests similar to the first leaderboard request;

determine that one or more of the previously executed leaderboard requests to were completed via a leaderboard platform;

format the first transaction parameters of the first leaderboard request into a second format, wherein the first transaction parameters in the first format are incompatible with the leaderboard platform and the first transaction parameters in the second format are compatible with the leaderboard platform; and responsive to providing the first transaction parameters in the second format to the leaderboard platform, receive a first transaction outcome from the leaderboard platform with respect to the first leaderboard request, wherein the first transaction outcome for the first leaderboard request is to be provided to the first application.

14. The non-transitory computer readable medium of claim 13, wherein the processing device is further to:

receive a second request from a second application, wherein the second request comprises second transaction parameters in a third format that are incompatible with the leaderboard platform;

format the second transaction parameters into the second format that are compatible with the leaderboard platform; and responsive to providing the second transaction parameters in the second format to the leaderboard platform, receive a second transaction outcome from the leaderboard platform with respect to the second request.

15. The non-transitory computer readable medium of claim 13, wherein the first leaderboard request is to be executed by the leaderboard platform to provide a list of users and respective scores to the first application.

16. The non-transitory computer readable medium of claim 13, wherein the first transaction outcome comprises approval or denial of the first leaderboard request, wherein the processing device is further to configure the first transaction outcome based on the first application.

17. The non-transitory computer readable medium of claim 13, wherein the leaderboard platform is identified based on one or more of:

user information of a user that transmitted the first leaderboard request via a first user device;

device information of the first user device;

the first transaction parameters of the first leaderboard request; or location from which the first leaderboard request was transmitted.

\* \* \* \* \*